United States Patent
Hatakeyama

[15] 3,706,281
[45] Dec. 19, 1972

[54] METHOD AND SYSTEM FOR EJECTING FAIRING SECTIONS FROM A ROCKET VEHICLE

[72] Inventor: Lawrence F. Hatakeyama, Brookmont, Md.

[73] Assignee: The United States of America as represented by the Administrator of National Aeronautics and Space Administration

[22] Filed: April 1, 1971

[21] Appl. No.: 130,353

[52] U.S. Cl. .................................................102/49.5
[51] Int. Cl. .................................................F42b 15/00
[58] Field of Search ............102/49.4, 49.5; 244/155

[56] References Cited

UNITED STATES PATENTS 3,318,241   5/1967   Gould..............................102/49.5 X
3,351,013   11/1967  Simmons..........................102/49.4 X

OTHER PUBLICATIONS

W. J. D. Escher et al., A Sequence Diagram Analysis of the Vanguard Satellite Launching Vehicle, NASATND-782, pages 36 and FIGS. 2 and 3 relied on. May, 1961

Primary Examiner—Verlin R. Pendegrass
Attorney—R. F. Kempf, Neil B. Siegel and John R. Manning

[57] ABSTRACT

A method and system for deploying releasable clamshell fairing sections from a spinning rocket vehicle body, in which each fairing section is retained at its lower trailing edge portion, relative to the spin direction of the rocket, until it has been substantially despun and rotated outwardly from the rocket through a predetermined angle to thereby substantially eliminate the possibility of the fairing sections striking the vehicle payload. In a preferred constructional embodiment, a separable hinge unit is utilized connecting the lower trailing corner portion of each fairing section to the rocket vehicle body, whereby this portion will be the last to separate from the vehicle body and will be retained until the fairing section has rotated outwardly through the predetermined angle.

11 Claims, 7 Drawing Figures

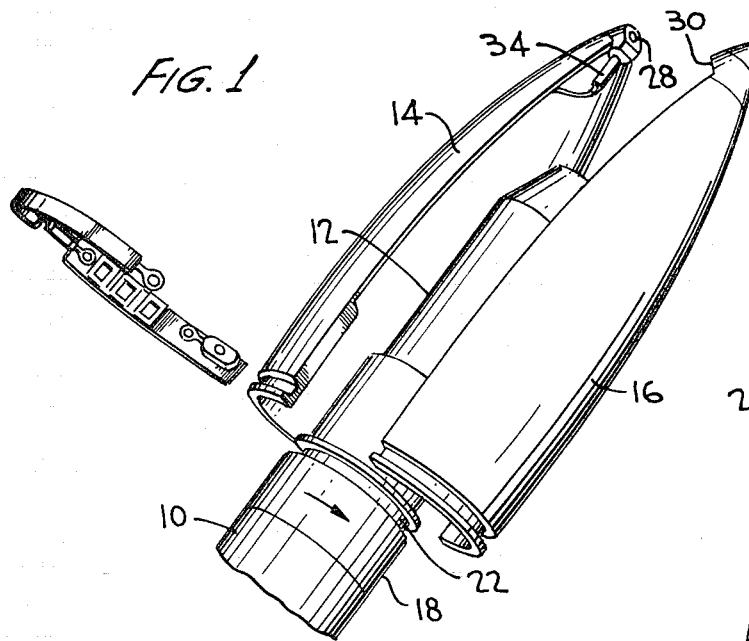
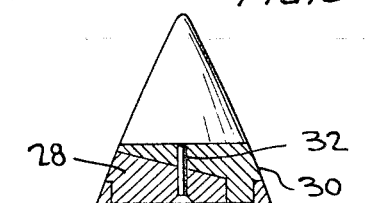
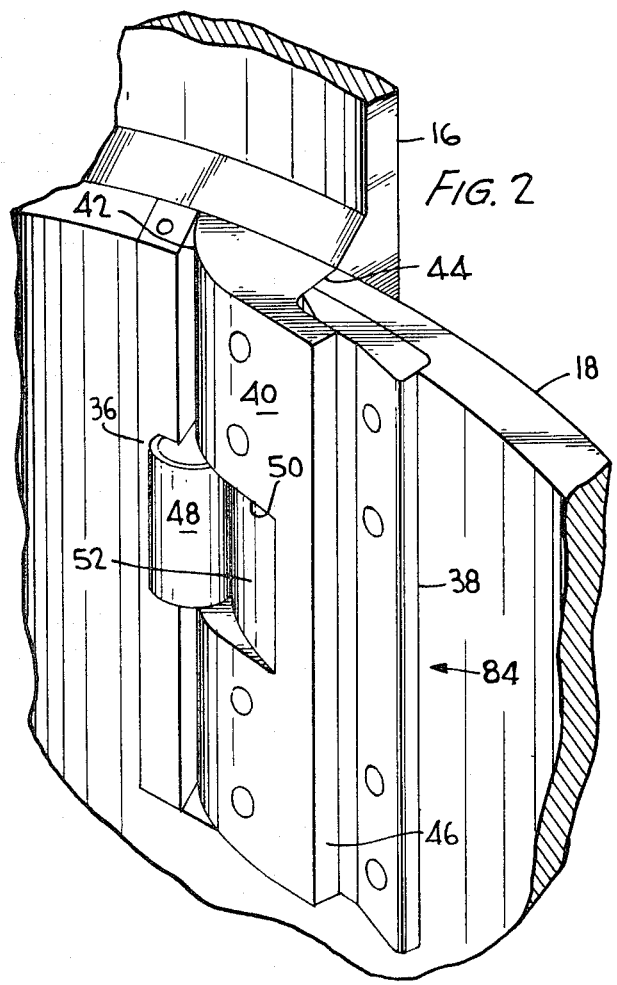
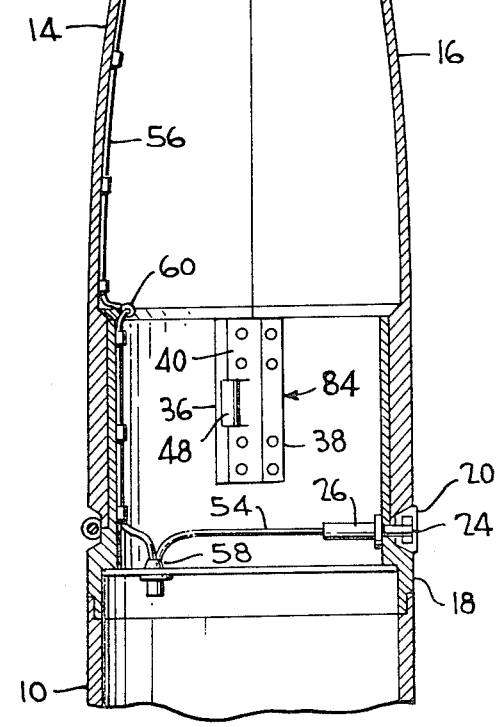
INVENTOR,
LAWRENCE F. HATAKEYAMA

INVENTOR,
LAWRENCE F. HATAKEYAMA
BY
Neil B. Siegel
ATTORNEYS

METHOD AND SYSTEM FOR EJECTING FAIRING SECTIONS FROM A ROCKET VEHICLE

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

This invention relates generally to rocket vehicles and the like, and more particularly to an ejection system for deploying ejectable covers or fairings.

In current rocketry practice, and particularly in conjunction with payload-carrying rockets, it is customary to provide coverings or fairings in order to shield the instruments and other apparatus in the payloads from the high temperatures and dynamic pressures generated during passage through the lower, denser portion of the atmosphere, due to the comparative high speeds at which the rockets travel. In order for such instruments or other apparatus in the payloads to be operative once the rocket vehicle has reached the upper, less dense portions of the atmosphere, it is frequently required that such covers or fairings be ejected in a safe and timely manner, as for example, to permit the deployment of antennas and other apparatus, or to expose the instruments so that measurements can be taken, or to permit the disengagement and deployment of multiple payloads or parts thereof from the body of the rocket vehicle.

A typical type of cover or fairing for such purposes can be characterized briefly as a unitary shell forming a body of revolution, which is closed at its forward end and defines a conventional nose cone or the like, and which is open at its rearward end and secured at this rearward end to the body of the rocket vehicle. Such one-piece shells are typically ejected from the rocket vehicle by springs or other means in the forward axial direction relative to the rocket vehicle.

Another known form of such covers or fairings is generally similar to that described above, except that the shell or body of revolution comprises a plurality of individual sections, which sections are held together by pins, bands, clamps and the like or created by the cutting action of pyrotechnic or similar cutting devices from a one-piece body. These individual sections, commonly referred to and hereinafter described as clamshells, are ejected by suitable means in a manner which imparts to each of these sections a radial translatory motion relative to the payload. Hence, the ejected clamshells do not obstruct the viewing field or sensitive range of optical or other payload instruments, and do not contaminate and disturb the flight environment of the payloads with emitted particles, nor do they pose collision hazards with the payloads except for an extremely short instant of time, immediately following their deployment from the rocket vehicle.

Ejection systems for deploying such clamshell sections of the latter-described type are known per se, and are shown in the U. S. Pats. to Fahl, No. 3,070,018, and to Carr et al, No. 3,362,290. In each of these systems, a pyrotechnic or similar separating device is utilized to impart to each of the clamshell fairing sections an outward translatory movement, which force preferably passes substantially through the center of mass of each of the fairing clamshell sections. In this manner, it will be seen that a substantially pure translatory force is applied to each of the clamshell sections, causing it to be ejected radially from the payload and thus permit utilization of the instruments or other apparatus in the payload. Alternatively, if it is desired to have substantially omnidirectional use of the instruments or other apparatus in a plane transverse to the longitudinal axis of the vehicle, such fairing clamshell sections may be attached at their rearward or lower ends to the rocket vehicle by frangible straps or similar separable connecting elements, whereby it will be appreciated that a rotational moment will be imparted to each of the sections about a generally horizontal axis across the lower ends of each section, causing the sections to be rotated outwardly and downwardly with respect to the vehicle payload. Thus, the sections will be seen to clear the horizontal or transverse plane passing through the vicinity of the payload.

Such known fairing ejection deployment systems and methods have proven to be highly successful in ejecting the clamshell fairing sections when the rocket vehicle is not spinning. However, in many applications, particularly in connection with the use of sounding rockets, it is necessary to impart a spinning movement to the rocket vehicle body, in order to improve the directional stabilization qualities of the rocket vehicle during its forward movement. It has been found that such known deployment systems cannot be used successfully when the rocket vehicle is spinning, inasmuch as each of the fairing sections will then be imparted rotational movements about all three of its centroidal principal axes, thus increasing the danger that the sections may collide with the payload and thus cause structural damage thereto. Additionally, the use of such releasing and deployment systems in connection with spinning rockets, due to the absorption of energy by such development of rotational movement to the fairing sections, results in corresponding de-spinning of the rocket vehicle, thereby adversely affecting the directional stability of the longitudinal movement of such rocket vehicle.

In an effort to overcome such drawbacks of known ejection systems in connection with the use of spinning rocket vehicle bodies, it has been proposed to separate each of the fairing sections from the rocket vehicle body along its trailing edge, relative to the direction of spin of the rocket, while temporarily retaining the leading edge to the rocket vehicle, whereby the rotational momentum of each fairing section will cause it to roll out relative to the vehicle body, without the application of any positive ejection force, about an axis generally corresponding to the leading edge of the clamshell fairing section. This method of utilizing the rotational momentum of the fairing sections to effect such roll-out has proven partially successful, in that it has substantially eliminated any danger of the fairing sections striking the payload; however, this method has proven unsuccessful in eliminating de-spinning of the rocket vehicle body, inasmuch as the additional forward momentum required to be applied to the fairing sections to achieve this roll-out results in a corresponding decrease of the rotational momentum of the rocket vehicle body itself, and hence a corresponding reduction in the spin rate of the rocket vehicle, thus creating an adverse directional instability of the rocket vehicle. Additionally, such prior known methods have not been entirely successful in eliminating undesirable yawing or pitching of the clamshell fairing sections relative to the rocket vehicle body during deployment without the use of additional mechanical constraints.

SUMMARY OF THE INVENTION

With the above background in mind, it is therefore a primary object of the present invention to provide a method and system for deploying releasable clamshell fairing sections from a spinning rocket vehicle body, which overcome the abovementioned drawbacks of prior known methods and systems.

Specifically, it is an object of the present invention to provide a method and system for deploying such clamshell sections which reduce the rotational energy in each of such sections while restraining each of such sections to diminished rotation about an axis generally parallel to the longitudinal axis of the rocket body during the deployment operation.

It is a further object of the present invention to provide such a method and system which substantially eliminate all danger of collision of the clamshell sections with the payload of the rocket.

It is yet a further object of the present invention to provide such a method and system which effectively and reliably deploy the clamshell systems without significantly de-spinning the rocket body.

It is still a further object of the present invention to provide such a method and system for deploying such clamshell sections, which achieve all of the foregoing objects without the need for applying a positive ejection force to the clamshell sections.

These, as well as other objects which will become apparent as the description proceeds, are implemented by the inventive method and system for deploying releasable clamshell fairing systems from a spinning rocket vehicle body, in which each fairing section is retained at its lower trailing edge portion, relative to the spin direction of the rocket, until it has rotated outwardly from the rocket vehicle body through a predetermined angle, due to its own rotational momentum, to decrease its rotational momentum while increasing its translational momentum and thereby substantially eliminate the possibility of the fairing sections striking the vehicle payload. In a preferred constructional embodiment, each of the fairing sections is connected to the vehicle body at such lower trailing edge portion by a two-part hinge means, which hinge means retains such lower trailing edge portion while permitting outward rotation of the clamshell section about an axis generally parallel to the longitudinal axis of the rocket through a predetermined angle, and then releases the clamshell section once it has rotated outwardly through such predetermined angle.

BRIEF DESCRIPTION OF THE DRAWINGS

The invention itself will be better understood, and additional objects, features and advantages thereof will become apparent, from the following detailed description of a preferred embodiment of the inventive method and system, taken in conjunction with the accompanying drawings, in which:

FIG. 1 is a pictorial view showing elements of the inventive system following deployment of the clamshells from the rocket vehicle body;

FIG. 2 is an enlarged pictorial view, seen from the inside of the rocket vehicle, showing a preferred hinge arrangement before deployment of the clamshell sections;

FIG. 3 is a longitudinal sectional view through a rocket vehicle employing the inventive system;

DETAILED DESCRIPTION OF THE INVENTION

Figure 4:
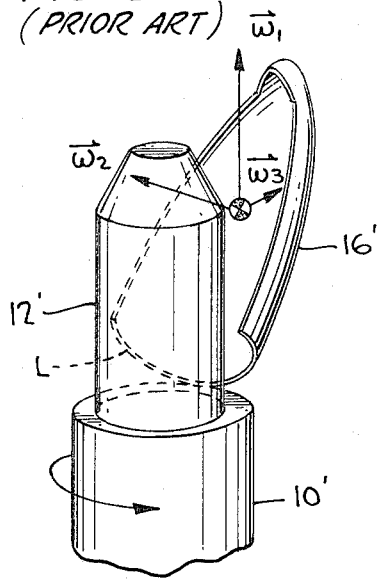
FIG. 4 is a schematic pictorial view illustrating the rotational forces applied to a clamshell deployed according to known prior methods.

Referring now to the drawings, and initially particularly to FIGS. 1-3 thereof, there is illustrated schematically a rocket vehicle 10 carrying a payload section 12 at the forward end thereof, which payload section 12 is protected by a pair of opposed clamshell fairing sections 14 and 16. While two of such fairing sections are shown, comprising diametrically opposed shell halves of the fairing, it should be understood that any suitable number of such fairing sections may be utilized. As noted in the introduction, the purpose of these fairing sections 14 and 16 is to provide essentially a cover for the payload section 12, in order to protect such payload from the high temperatures and high dynamic pressures encountered during the high-speed portion of the flight through the lower, denser portions of the atmosphere.

Means are provided for releasably securing each of the clamshell sections 14, 16 to the rocket vehicle body 10, and more particularly to an adaptor section 18 thereof. As illustrated, such releasable securing means may preferably comprise a circumferential open-ended band clamp 20 which surrounds the lower ends of the clamshells 14 and 16 and the ends of which overlap axially to clamp the sections to each other as well as to a suitable retaining flange portion 22 on the adaptor section 18 of the rocket vehicle body. In the initial assembled relationship of the clamshell sections 14 and 16 to the vehicle body 10, the ends of the band clamp 20 are retained together by the pin 24 of a conventional pinpuller mechanism 26, which pin extends through suitable openings in both ends of the band clamp 20 and through one of the clamshell fairing sections, illustrated as 16 in FIG. 3. Thus, it should be appreciated that when the pin 24 is retracted through actuation of the pinpuller mechanism 26, the ends of the band clamp 20 will be released from each other, and the band clamp will fly off under the combined influence of its own tension and the roll or spinning motion of the rocket vehicle body 10, thus releasing the clamshell fairing sections 14 and 16 from each other and from the adaptor section 18.

Alternatively, any other suitable means may be utilized for connecting the lower or rearward ends of the clamshell fairings 14 and 16 to the adaptor section 18 of the rocket vehicle body, as for example, rupturable plates, joints, or seams, which may be separated under the influence of a suitable explosive or other separating device, not shown. In any event, it will be understood that the explosive pin-puller mechanism 26, or equivalent system, comprises a separating means for the releasable securing means defined by the band clamp 20 and the pin 24.

Other securing means are provided for releasably securing the clamshell fairing sections 14 and 16 to each other adjacent their forward ends, relative to the direction of travel of the rocket vehicle. To this end, each of the fairing sections 14 and 16 has at its forward end an inwardly extending portion 28, 30, respectively, which overlap in the axial direction and which include aligned bores through which extends the pin 32 of an explosive pin-puller mechanism 34, or similar releasable device, which may correspond essentially to that indicated as 26. As will be described in greater detail at a later point, the pin-puller mechanisms 26 and 34 are activated by signals from a suitable source, not shown, once the vehicle has reached the upper portions of the atmosphere, to thus separate the clamshell sections 14 and 16 from each other and from the rocket vehicle body 10, to thereby initiate the deployment operation.

If the clamshell sections 14 and 16 were secured to the rocket vehicle body 10 only by the band clamp 20 and pin 24, release of the clamshell sections from the rocket vehicle body, due to their rotational momentum, would cause rotation of each of these sections about a longitudinal axis passing essentially through the center of mass of the respective sections, and thus each section would rotate in the retrograde direction, relative to the spin direction of the rocket vehicle 10, with the trailing edge swinging inwardly towards the payload and the leading edge swinging outwardly. Thus, there would be created the danger that the trailing edge, relative to the spin direction of the rocket vehicle, upon swinging inwardly would strike and damage the payload 12. Accordingly, there are provided other retaining means for retaining the trailing edge of each fairing section to the rocket vehicle body, to thereby cause the sections to rotate outwardly about respective longitudinal axes passing through such retaining means and corresponding generally to such trailing edges, and thereafter to release the fairing sections when the clamshell sections have rotated outwardly through a predetermined angle sufficient to insure that such collision with the payload will not occur. A preferred embodiment of such a releasable securing means is illustrated schematically in FIG. 3 and indicated generally by reference numeral 84, and is illustrated in greater detail in FIG. 2, representing the securing means as it would be seen from the interior of the rocket vehicle. Essentially, such securing means comprises a two-part separable hinge means for each of the clamshell sections 14 and 16, only one of such hinge means being illustrated in FIGS. 2 and 3, and having a first part secured to the rocket vehicle body and a second part secured to the fairing section. Still more particularly, the first or stationary part of the hinge means is illustrated as comprising first and second, circumferentially spaced hinge members 36 and 38, respectively, while the second or movable part of the hinge means comprises a member 40 secured to the lower trailing edge portion of the clamshell fairing section 16, and having leading and trailing edges 42, 44 which respectively abut against the first and second hinge members 36 and 38. The movable or second part 44 further comprises a radially inwardly offset flange portion 46 which extends rearwardly therefrom and overlaps at least a portion of the second hinge member 38 on the radially inward side thereof. Thus, it will be seen that this offset flange portion 46 prevents a linear outward radial movement of the clamshell section 16, relative to the rocket vehicle body, but instead requires that the member 40, and hence the clamshell section 16, rotate in a retrograde manner, relative to the rocket vehicle spin, (i.e., clockwise as seen from the top), before the offset flange portion 46 will clear the opening defined between the respective edges of the first and second hinge members 36 and 38. The circumferential length of flange portion 46, and the radial offset thereof and the thickness of second hinge member 38, thus define a particular angle through which the clamshell 16 must rotate in this retrograde direction before this flange portion 46 will clear such opening, and thus define a predetermined angle through which the clamshell section 16 must rotate before it will be completely released from the rocket vehicle body.

Preferably, the first hinge member 36 includes a rearwardly extending, rotatable roller 48 which fits into a corresponding recess 50 in the member 40, such rotatable roller and recess having complementary surfaces extending in the circumferential direction of the rocket vehicle (i.e., generally horizontally when the rocket is in a vertical position) in order to substantially prevent any yawing movement of the clamshell section 16 about an axis extending transversely to the longitudinal axis of the rocket vehicle body. In this manner, it will be seen that additional safeguards are provided for insuring that each clamshell fairing section will rotate only about the longitudinal axis extending through the separable hinge means, and corresponding essentially to the longitudinal trailing edge of the fairing section. Preferably, the recess 50 of the member 40 may have a curvilinear contour, indicated as 52, which will serve to assist in guiding the rotational movement of the member 40 as it moves with the roller 48 of the first hinge member 36.

It has been found that, due to the extremely high forces encountered, partially due to the comparatively large weights of the clamshell sections 14 and 16, that large frictional forces may be encountered between the leading edge 42 of the member 40, and the edge of the first hinge member 36, during the outward rotation of the clamshell sections during deployment. Accordingly, if desired, suitable means may be provided for reducing or substantially eliminating such frictional forces. Thus, for example, the leading edge portions of member 40 and the trailing edge portions of hinge member 36, which slide upon each other, may be treated with a suitable low-friction material such as by applying a coating of "Teflon". Alternatively, when the center of mass of the clamshells 14, 16 is below the top edge of the adaptor section 18, e.g. a long adaptor, a rectangular projection may be used in place of rotatable roller 48.

In operation, when the rocket vehicle 10, carrying the payload 12 and fairing sections 14 and 16, has reached the upper, less dense portions of the atmosphere, then it becomes desirable to deploy the clamshell sections to thereby render the instruments or other apparatus of the payload 12 effective. Accordingly, as has been noted, the explosive pin-puller mechanisms 26 and 34 are utilized to retract their respective pins 24, 32 to thereby release the fairing sections from each other and from the rocket vehicle. The pin-puller mechanisms 26 and 34 receive electrical signals to activate same, through respective insulated leads 54, 56 which are connected to an electrical receptacle 58 connected in turn to any suitable signal source in the rocket vehicle body itself. Preferably, the lead 56 connecting the pin-puller 34 on the clamshell section 14 to the receptacle 58 includes a pull-away connector 60 to permit ready disconnection of this lead from the rocket vehicle when the clamshell portion 14 is ejected or deployed. While the leads 54 and 56 may be connected through receptacle 58 to a common signal source, in order to permit simultaneous activation of the pin-pullers 26 and 34, preferably they are connected to separate signal sources to permit sequential operation of the pin-puller mechanisms, i.e., preferably pin-puller mechanism 26 is activated first to release the lower ends of the clamshell sections 14 and 16 from the adaptor section 18 of the rocket vehicle body 10, and then, following a short time delay, the pin-puller mechanism 34 is activated to release the upper ends of the clamshell fairing sections from each other.

While the releasable connecting means 84 for only one of the clamshell sections 16 has been illustrated in FIGS. 2 and 3, it should be understood that an identical separable hinge arrangement is utilized to connect the other of the clamshell sections 14 to the rocket vehicle body, such other separable hinge arrangement being constructed and operating in precisely the same manner as has been described above.

In FIG. 4, there is illustrated the manner in which prior systems have raised the danger of collision with the payload. In this figure, reference numerals 10', 12' and 16', respectively, represent a conventional rocket vehicle body, payload, and a single clamshell fairing section. Such conventional fairing sections have frequently been secured to the vehicle body 10' by a frangible strap or similar separable connecting element at generally the center of the peripheral or circumferential extent of the lower edge of the fairing section 16', i.e., at approximately the point at which the fairing section 16' is shown as tangent to the vehicle body 10', and are ejected outwardly through the application of a radial ejecting force, as from a pyrotechnic ejecting device or the like. It will be noted that, in such known method, the fairing section 16' has three rotational rates designated as $\bar{\omega}_1$, $\bar{\omega}_2$, and $\bar{\omega}_3$, respectively due to the rotational movement of the rocket vehicle about its longitudinal axis, the outward pitching due to the ejection impulse from the pyrotechnic device or similar mechanism, and the Coriolis forces which strained the frangible strap as it pitched out. Due to the angular rates $\bar{\omega}_1$ and $\bar{\omega}_3$, the lower leading edge portion of fairing section 16', designated generally as L, will tend to sweep or rotate into the space occupied by the payload 12'. Such collision with the payload can be avoided by substantially increasing $\bar{\omega}_2$ relative to $\bar{\omega}_1$, as, through the use of the pyrotechnic ejection device. However, such an application has its limitations, due to the requirement for a heavily beefed up system to handle the increased load imposed by such ejection impulse and has not entirely avoided the problem of collision of the fairing section with the payload section.

Figure 5:
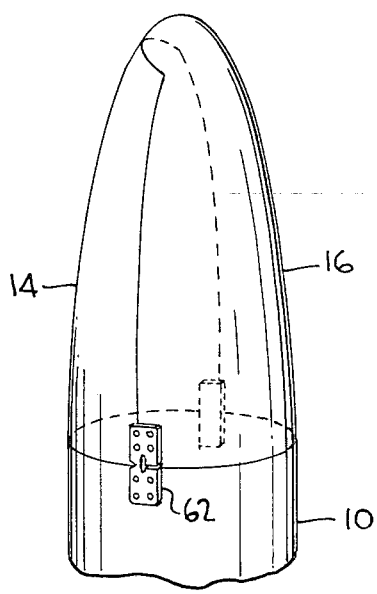
FIG. 5 is a schematic pictorial view illustrating an alternative embodiment of hinge member according to the inventive system.

Accordingly, in FIG. 5, there is shown a modified system, according to the present invention, likewise utilizing frangible straps or similar separable connecting members for releasable securing the clamshell fairing sections 14, 16 to the rocket vehicle body, but in this case the frangible strap member, designated generally as 62, serves to releasably secure the lower trailing portion of each clamshell section, relative to the direction of rocket spin, to the rocket vehicle body, in the same manner as has been previously described with reference to the separable hinge means 34 of FIGS. 1–3. As illustrated in greater detail in FIG. 7, the frangible strap 62 according to the present invention is secured at its upper half to the trailing lower edge portion of one of the clamshell sections 14 or 16, and its lower half is secured to the rocket vehicle body 10. Such securement may be made by any suitable means, as for example, by bolts or similar structural connecting members extending through suitable openings 64 in the upper and lower halves of the frangible strap member 62.

Figure 7:
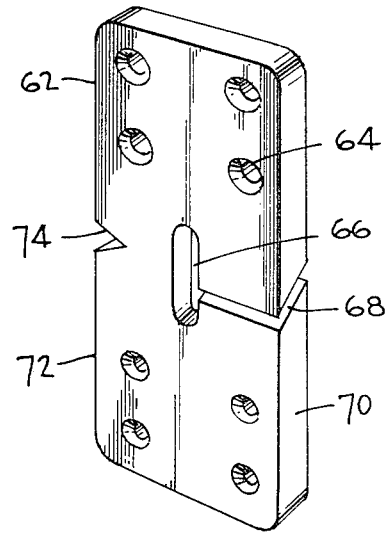
FIG. 7 is an enlarged pictorial view of the alternative hinge construction illustrated in FIGS. 5 and 6.

The frangible strap 62 is illustrated in FIG. 7 as it appears from the exterior of the rocket vehicle, and it is presumed for the sake of illustration that the rocket vehicle is rotating in the same direction as has previously been described, i.e., counter-clockwise as viewed from the top or nose end. Accordingly, the frangible strap 62 includes an elongated hole or slot 66 in its central portion, generally extending across the eventual line of separation, and an angled cut 68 that extends from the central hole or slot 66 towards the leading edge 70 of the strap 62. The angled cut 68 extends through the entire thickness of the strap 62, and is preferably angled such that it is higher on its inner surface, i.e., that surface facing the rocket vehicle, and lower on the surface facing away from the rocket vehicle. Additionally, there is provided a notch 74 in the trailing edge 72 of the strap, which notch may be advantageously V-shaped, in order to facilitate shearing of the strap along a zone between such notch and the central hole or slot 66.

In the embodiment using this frangible strap 62 for securing each of the clamshell sections 14 and 16 to the rocket vehicle, there may be utilized any suitable primary means for connecting the clamshell sections to each other and to the rocket vehicle and for this purpose the pin-pullers 26 and 34, and associated pins, as well as the band clamp 20, may be utilized. Once these primary securing means have been released, then, in the same manner as has been previously described, the respective clamshell section will roll outwardly about a longitudinal axis generally parallel to that of the rocket vehicle, and passing through the frangible strap 62. Additionally, since no means are provided for preventing pitching or yawing of the clamshell section, such section will also partake of such pitching or yawing motion, this motion in combination with the roll-out motion producing a severing of the frangible strap 62 along the zone defined between the notch 74 and the central opening 66, thus releasing the clamshell fairing from the rocket vehicle once the fairing has rotated outwardly through an angle sufficient to shear this zone of separation of the frangible strap 62.

Inasmuch as, as has been noted immediately above, no means are provided in the embodiment of FIGS. 5–7 for restraining the clamshell sections against yawing motion, and in fact, such yawing motion is necessary to some extent to produce an effective severing of the frangible straps, it has been found that the hinge structure illustrated and described in connection with FIGS. 1–3 is preferable, inasmuch as this embodiment does in fact provide such means for preventing the yawing and pitching motions of the clamshell section, and thus effects a more precise control over the mode of rotation of each of the clamshells 14 and 16.

Figure 6:
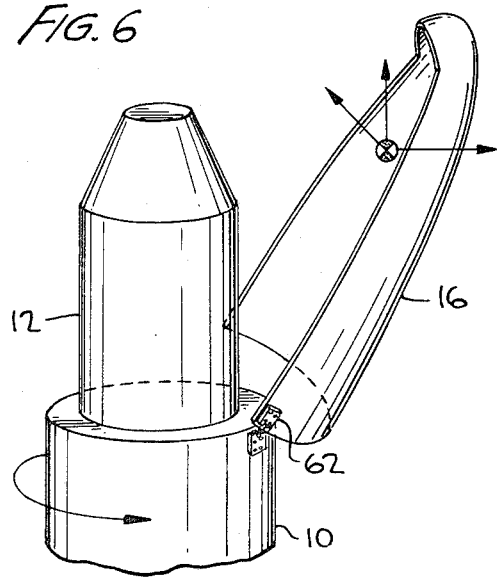
FIG. 6 is a schematic pictorial view similar to FIG. 4, showing the rotational forces according to the present invention.

In FIG. 6, there is illustrated schematically the manner in which a clamshell fairing section 16, secured to the rocket vehicle body 10 by means of a frangible strap 62 at its lower trailing edge portion, exhibits both a pitching motion outwardly from the rocket vehicle, and a retrograde rotational movement about an axis generally parallel to the longitudinal axis of the rocket vehicle and passing through the frangible hinge member 62. In this embodiment, as was the case with that described in reference to FIGS. 1–3, such retrograde roll-out movement of the clamshell 16 about this axis insures that the leading edge portion of the clamshell 16 will swing clear of the payload 12, and thus will entirely or substantially eliminate any possibility of the section 16 striking the payload 12.

In the first of the embodiments described, it should be appreciated that no ejection means has been required for effecting separation of the clamshell sections from the rocket vehicle body; in fact, such ejection means, corresponding to prior known pyrotechnic ejection devices, are not desirable, inasmuch as they would introduce additional components of rotation to the clamshell fairing sections in a manner which it has been a primary object of the present invention to overcome. Merely by releasing the securing means, while retaining the trailing lower edge portion of each clamshell section to the rocket vehicle body by means of either the hinge arrangement 84, or the frangible hinge strap 62, the rotational momentum of the clamshell section itself will effect the retrograde roll-out movement of the respective clamshell sections in the manner desired. Further, since such roll-out movement of the clamshell sections derives solely from their own rotational momentum, derived from the original spin of these while they are secured to the rocket vehicle body, this retrograde spinout will result only in de-spinning of the clamshell sections themselves, and will not appreciably de-spin the rocket vehicle body itself. Thus, it will be seen that a significant advance has been achieved over prior art methods and systems, in which, in addition to raising the danger of colliding with the payload, there has been necessitated a de-spinning of the rocket vehicle in an adverse manner to achieve proper and efficient complete separation of the clamshell sections from the rocket vehicle body.

Through the provisions of a method and system for deploying clamshell sections from a spinning rocket vehicle, as described in detail above, it is believed apparent that all of the objects of the invention set forth at the outset to the specification have successfully been fulfilled.

I claim:

1. A method for deploying releasable clamshell fairing sections from a spinning rocket vehicle body, comprising releasing the fairing sections from substantially their entire connection with the vehicle body; retaining the lower trailing edge portion of each fairing section with hinge means whose axis is substantially parallel to the spin axis of the rocket vehicle body, whereby each section will rotate outwardly from the vehicle body about the hinge means axis; and then releasing such lower trailing edge portions when the fairing sections have rotated outwardly through a predetermined angle.

2. A method as defined in claim 1, wherein the fairing sections are initially further secured to each other at a location spaced from the connection with the vehicle body, further comprising releasing the fairing sections at said location from each other not later than release of the sections from the vehicle body.

3. A method as defined in claim 2, wherein the fairing sections are released from each other at said locations prior to release from the vehicle body.

4. A system for deploying releasable clamshell fairing sections from a spinning rocket vehicle body, comprising first releasable securing means for releasably securing each of said sections to the rocket vehicle body; first releasing means for releasing said first securing means; and separable hinge means whose axis is substantially parallel to the spin axis of the rocket vehicle body for releasably securing the lower trailing edge portion of each section while permitting outward rotation of each section about the hinge means axis, following release of said first securing means, said separable hinge means being adapted to release its respective fairing section following outward rotation thereof through a predetermined angle.

5. A system as defined in claim 4 wherein said separable hinge means has a first part secured to the rocket vehicle body and a second part secured to the respective fairing section, said first and second parts being configured to separate from each other upon outward rotation of the fairing section through the predetermined angle.

6. A system as defined in claim 5, wherein said first part of said hinge means comprises first and second circumferentially spaced hinge members secured to the rocket vehicle body and respectively leading and trailing said second part of said hinge means, said second part having a leading edge and a trailing edge respectively abutting said first and second hinge members and a radially inwardly offset flange portion extending rearwardly and overlapping at least a portion of said second hinge member radially inwardly thereof, to thereby prevent linear radial outward movement of said second part and of the fairing section while permitting outward rotation thereof with respect to the rocket vehicle body.

7. A system as defined in claim 6, wherein said second part of said hinge means and said first hinge member comprise cooperating guide surfaces extending circumferentially relative to the vehicle body and restraining movement of said second part and clamshell member to rotation about said longitudinal axis, to thereby preclude yawing movement thereof relative to the vehicle body.

8. A system as defined in claim 7, wherein said leading edge of said second part of said hinge means further includes a curvilinear portion adapted for outward rolling movement relative to said first hinge member to facilitate the outward rotation of said second part and the fairing section relative to the vehicle body.

9. A system as defined in claim 8, further comprising third releasable securing means for releasably securing the fairing sections to each other at the forward ends thereof, and second releasing means for releasing said third securing means.

10. A system as defined in claim 9, wherein said first securing means comprises an open-ended band clamp surrounding the fairing sections and the rocket vehicle body, and pin means extending through the end of said band clamp and through one of the fairing sections; said third securing means comprises pin means extending through complementary joining portions of the fairing sections; and said first and second releasing means each comprise explosive pin-puller means for retracting their respective pin means.

11. A system as defined in claim 5, wherein said first and second parts of said separable hinge means comprise respective end portions of a frangible hinge strap member, said strap member being severable intermediate said end portions upon outward rotation of the respective fairing section through the predetermined angle.

* * * * *